(12) United States Patent
Bunker et al.

(10) Patent No.: US 12,076,882 B1
(45) Date of Patent: Sep. 3, 2024

(54) APPARATUS AND METHOD FOR THE PRODUCTION OF BUILDINGS

(71) Applicant: I-CUBED INDUSTRY INNOVATORS INC., Stoney Creek (CA)

(72) Inventors: Dave Bunker, Grimsby (CA); Warren Reynolds, Stoney Creek (CA); Simon Nichols, Canfield (CA)

(73) Assignee: I-Cubed Industry Innovators Inc., Stoney Creek (CA)

( * ) Notice: Subject to any disclaimer, the term of this patent is extended or adjusted under 35 U.S.C. 154(b) by 1111 days.

(21) Appl. No.: 16/833,834

(22) Filed: Mar. 30, 2020

Related U.S. Application Data

(60) Provisional application No. 62/828,042, filed on Apr. 2, 2019, provisional application No. 62/825,384, filed on Mar. 28, 2019.

(51) Int. Cl.
| | |
|---|---|
| *B28B 1/00* | (2006.01) |
| *B33Y 30/00* | (2015.01) |
| *B33Y 70/00* | (2020.01) |
| *C04B 14/06* | (2006.01) |
| *C04B 28/04* | (2006.01) |
| *E04B 1/16* | (2006.01) |
| *E04B 1/35* | (2006.01) |
| *F04D 3/02* | (2006.01) |
| *C04B 111/00* | (2006.01) |

(52) U.S. Cl.
CPC .............. *B28B 1/001* (2013.01); *B33Y 30/00* (2014.12); *B33Y 70/00* (2014.12); *C04B 14/06* (2013.01); *C04B 28/04* (2013.01); *E04B 1/16* (2013.01); *E04B 1/3505* (2013.01); *F04D 3/02* (2013.01); *C04B 2111/00129* (2013.01)

(58) Field of Classification Search
CPC ......... B28B 1/001; B33Y 30/00; B33Y 70/00; C04B 14/06; C04B 2111/00129; E04B 1/16; E04B 1/3505; F04D 3/02
See application file for complete search history.

(56) References Cited

U.S. PATENT DOCUMENTS 4,798,510 A * 1/1989 Lazenby ............... E04G 21/025
414/326

* cited by examiner

*Primary Examiner* — Monica A Huson
*Assistant Examiner* — Kelsey C Grace
(74) *Attorney, Agent, or Firm* — Watts Law LLC; John A. Yirga, Esq.

(57) ABSTRACT

A concrete mixture is forced through a nozzle by an extruder. An applicator has: a body adapted for vertical movement; a primary arm mounted to the body for movement about a vertical axis, the arm being elongate, having ends, having a vertical axis adjacent one end and having a counterweight adjacent the other end; a secondary arm defining a vertical axis, extending from the vertical axis defined by the primary arm and configured for movement about said vertical axis; a tertiary arm mounted for movement along the secondary arm vertical axis; a rotator carried by the tertiary arm and which carries the nozzle and rotates the nozzle about a vertical axis; a primary rotation mechanism for rotating the primary arm about the primary arm axis; an actuator providing for movement of the secondary arm about the vertical axis; and an elevation mechanism providing for said tertiary arm vertical movement.

12 Claims, 17 Drawing Sheets

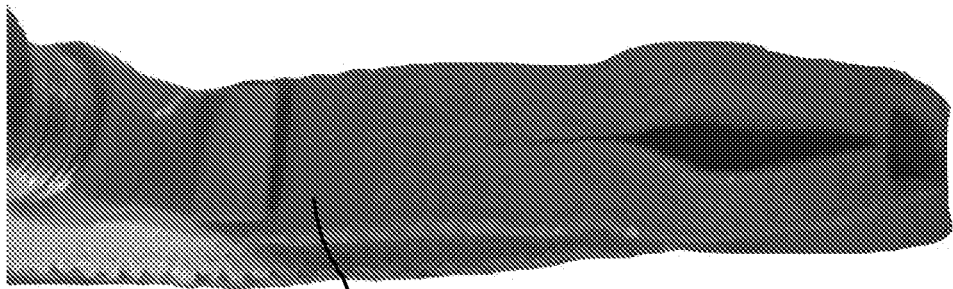
FIG.24 Streams merged and flattened by nozzle
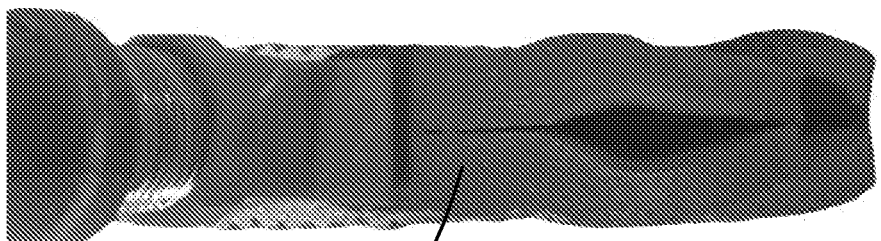
FIG.23 Streams starting to merge
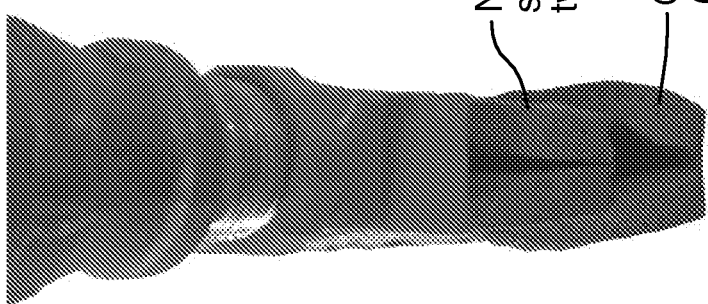
FIG.22 New bead starting with two streams / Old bead (layer 1)

APPARATUS AND METHOD FOR THE PRODUCTION OF BUILDINGS

CROSS REFERENCE TO RELATED APPLICATIONS

This application claims priority upon U.S. Provisional Patent Application 62/825,384 filed Mar. 28, 2019 and U.S. Provisional Patent Application 62/828,042 filed Apr. 4, 2019.

BACKGROUND

There exists significant interest in the use of three-dimensional printing technologies in the production of buildings but existing technologies have thus far not had significant commercial success.

SUMMARY OF THE INVENTION

Forming one aspect of the invention is a concrete mixture comprising: sand; Portland cement; water; and workability maintaining compound, wherein the ratio of sand:Portland:water:compound is about 1 cubic foot; 1 cubic foot; 1 cubic foot; 6 oz.

According to another aspect, the compound can be Viscoflow-2020 from Sika.

Forming another aspect of the invention is an extruder for use with the mixture, this extruder comprising a funnel, an impeller and a motor.

The funnel has: a vertical axis; a length defined by the axis; a frustoconical portion orientated coaxially with the axis and such that it tapers in diameter from top to bottom; a substantially cylindrical portion having a diameter C and a depth B, orientated coaxially with the axis and disposed above and in sealed communication with the top of the frustoconical portion; and a tubular portion orientated coaxially with the axis and disposed beneath and in sealed communication with the bottom of the frustoconical portion.

The impeller is disposed coaxially with and within the funnel, the impeller defined by an auger bit that extends substantially the length of the funnel;

The motor is for rotating the impeller.

According to another aspect, the impeller is an auger bit generally of the Irwin pattern type.

According to another aspect: the auger bit has a length E and a solid stem with a single spiral that extends the length of the funnel; the portion of the bit in the substantially cylindrical portion of the funnel has a diameter D and is cut away in two opposed quadrants; the portion of the bit in the frustoconical portion of the funnel tapers frustoconically at angle $\beta$; and the portion of the bit in the tubular portion of the funnel has a diameter G and a length F.

Forming another aspect of the invention is the combination of the extruder and a nozzle, the nozzle comprising: an outlet defined by a pair of planar sidewalls, a planar base and a planar top all creating a rectangular channel with a width W and a height H; and a rib orientated parallel to the sidewalls and projecting distance P upwardly from the base.

According to another aspect, the ratio of W:H:P:B:C:E:F:G:D:$\beta$ can be about 1.0":1.25":0.25":8.5":9:00":18.5":7.5":1.25":7.5":45°

Forming another aspect of the invention is the use of combination to lay a bead of concrete at about 50 feet per minute Forming another aspect of the invention is an application for use with the combination, the applicator comprising a body, a primary arm, a secondary arm, a tertiary arm, a rotator, a primary rotation mechanism, an actuator and an elevation mechanism.

The body is configured for constrained vertical movement;

The primary arm is operatively mounted to the body for movement about a vertical axis, the primary arm: being elongate; having a pair of ends; having a vertical axis adjacent one of the pair of ends; and having a counterweight adjacent the other of the pair of ends.

The secondary arm defines a vertical axis, extends from the vertical axis defined by the primary arm and is configured for movement about said vertical axis.

The tertiary arm is mounted for vertical translation movement along the vertical axis defined by the secondary arm, The rotator is carried by the tertiary arm, in use, carries the nozzle, and is adapted to rotate the nozzle about a vertical axis.

The primary rotation mechanism is for rotating the primary arm about the vertical axis.

The actuator provides for selective movement of the secondary arm about the vertical axis.

The elevation mechanism is operatively coupled between the tertiary arm and the second arm and provides for said selective vertical translation movement.

According to another aspect, the body can have a plurality of legs, a plurality of cam tracks and a lift mechanism.

Each leg has: a foot configured for ground engagement: a cam follower; a leg beam that extends from the foot to the cam follower and is pivotally connected thereto each about respective horizontal axes; and a swing arm that extends from the leg beam to the body and is pivotally connected thereto each about respective horizontal axes.

The cam tracks are provided one for each cam follower, each cam track being in receipt of the cam follower for which it is provided and providing for sliding movement thereof.

The lift mechanism is configured to selectively rotate the secondary arms.

Advantages, features and characteristics of the invention will become evident upon review of the following detailed description with reference to the appended drawings, the latter being briefly described hereinafter.

BRIEF DESCRIPTION OF THE DRAWINGS

The drawings show a nozzle, an extruder and an applicator, each constructed according to a non-limiting embodiment of the invention. In the drawings:

FIG. 22 is a partial view of the structure of FIG. 1 in use;

FIG. 23 is a view similar to FIG. 22; and

FIG. 24 is a view similar to FIG. 22.

DETAILED DESCRIPTION

Nozzle

Figure 1:
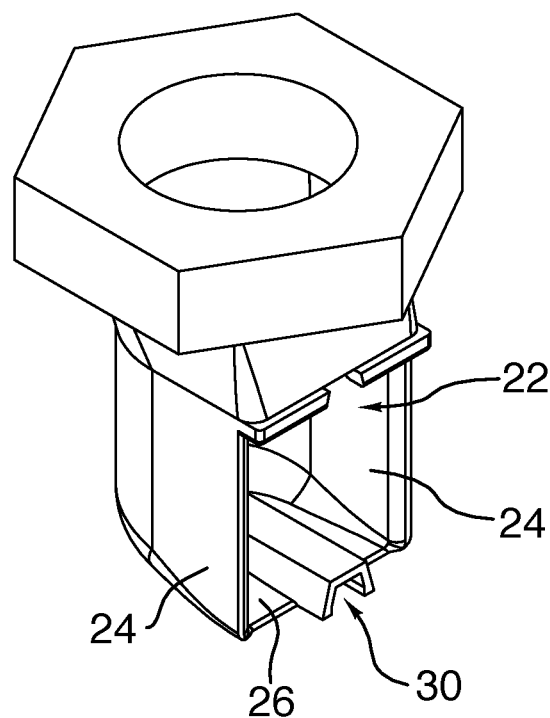
FIG. 1 is a front top right side view of the nozzle.
Figure 2:
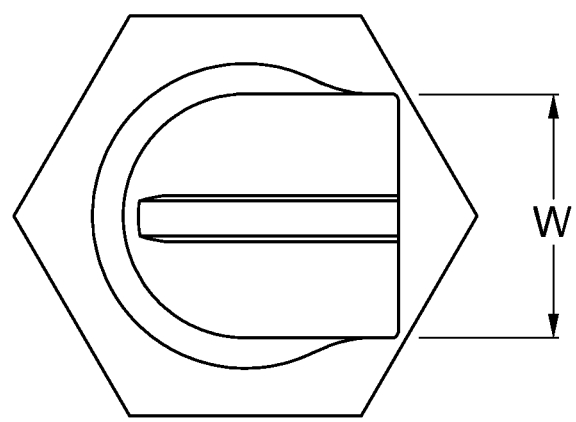
FIG. 2 is a bottom view of the structure of FIG. 1.
Figure 3:
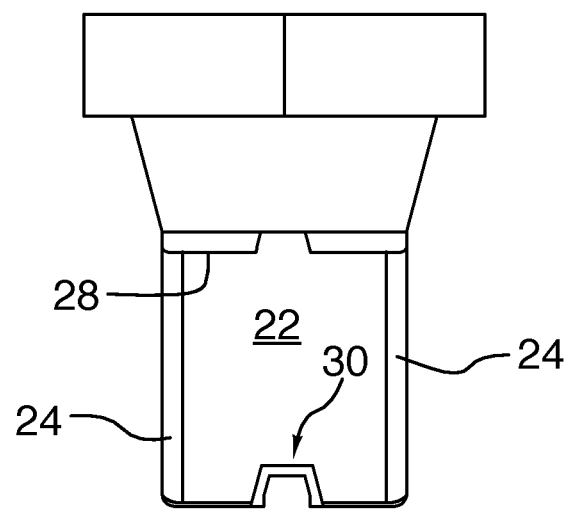
FIG. 3 is a front view of the structure of FIG. 1.
Figure 4:
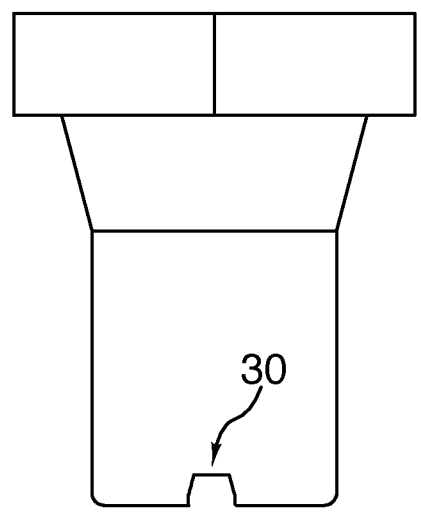
FIG. 4 is a rear view of the structure of FIG. 1.
Figure 5:
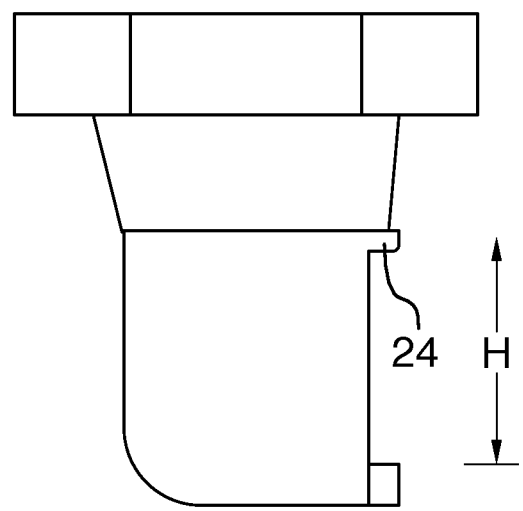
FIG. 5 is a right side view of the structure of FIG. 1.
Figure 6:
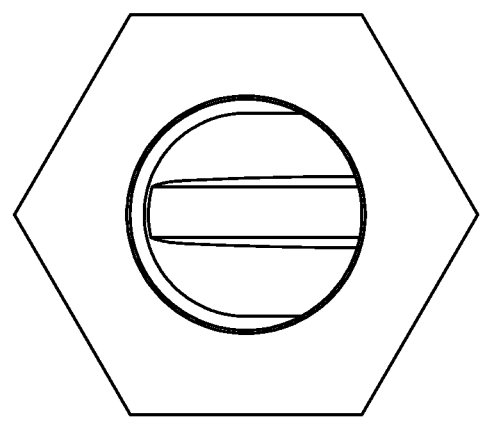
FIG. 6 is a top view of the structure of FIG. 1.
Figure 7:
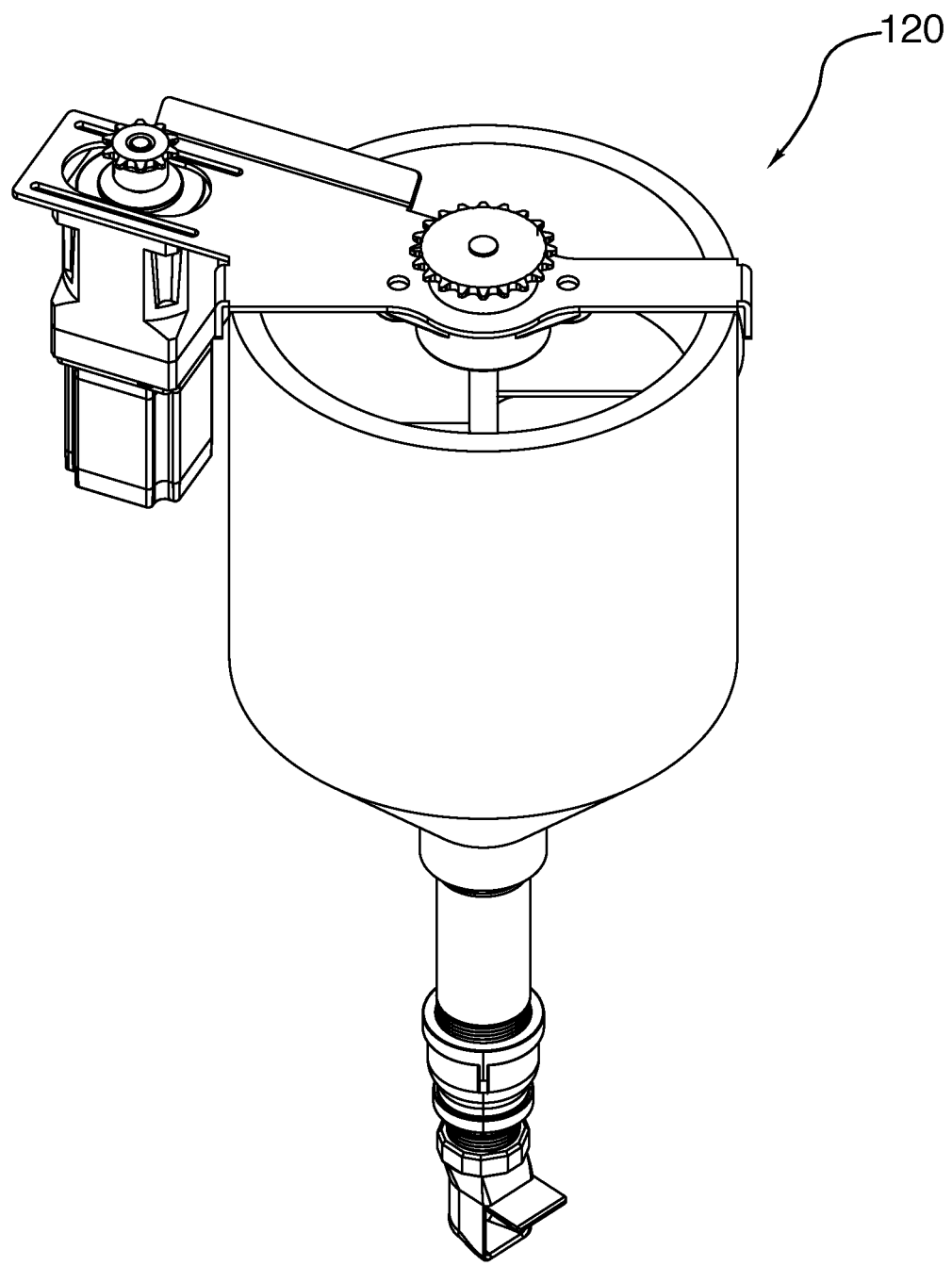
FIG. 7 is a front top right side of the extruder.
Figure 8:
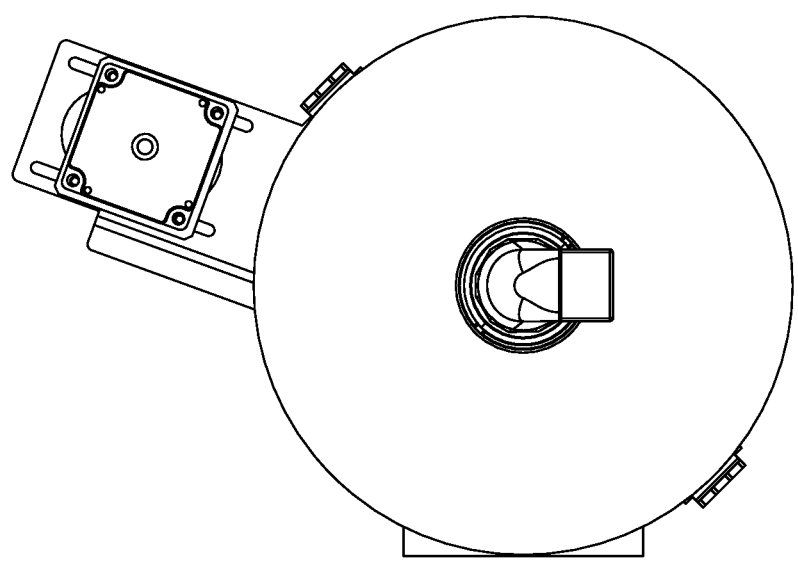
FIG. 8 is a bottom view of the extruder.
Figure 9:
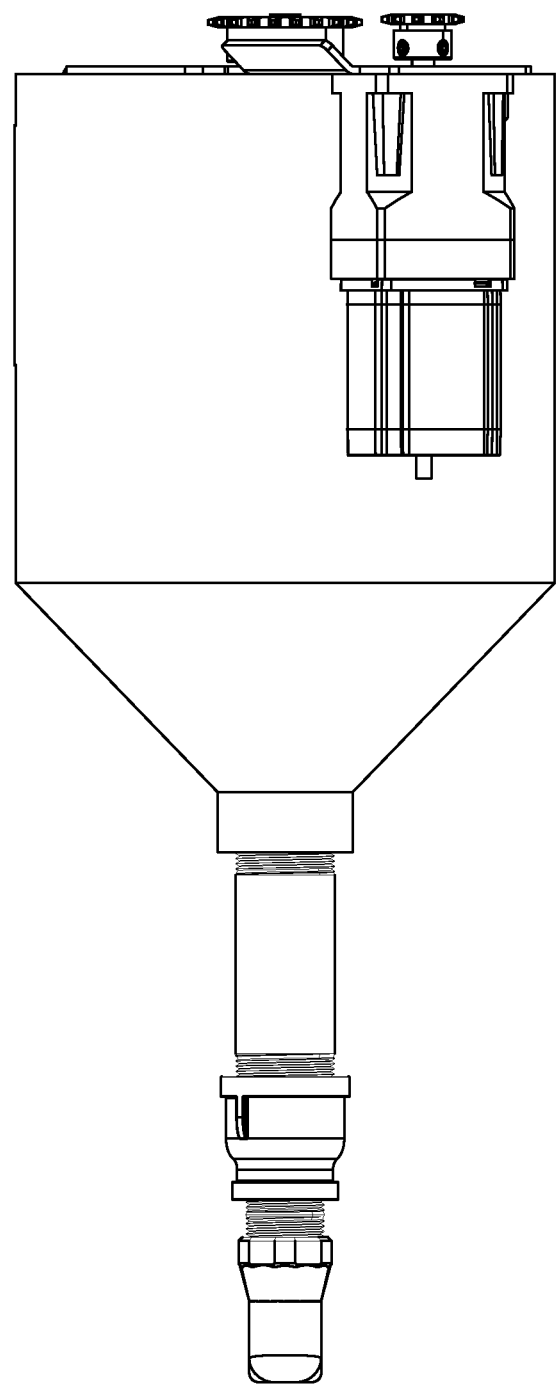
FIG. 9 is a rear view of the extruder.
Figure 10:
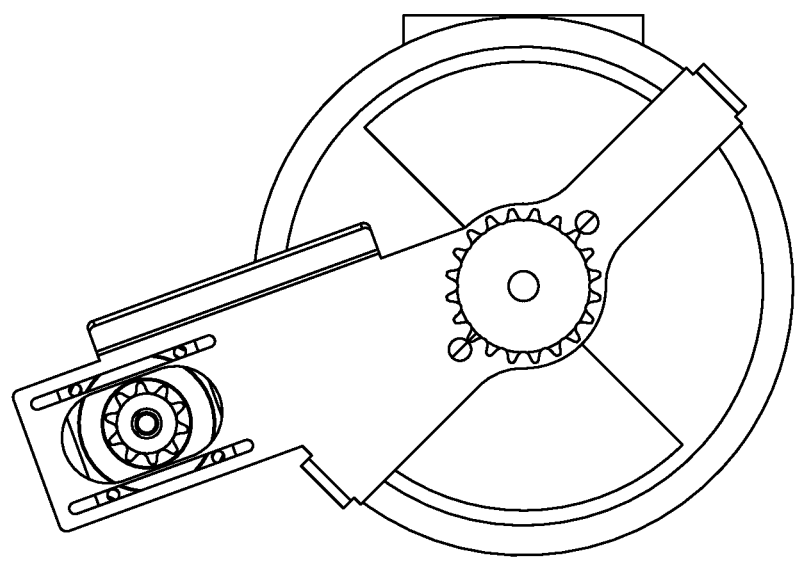
FIG. 10 is a top view of the extruder.
Figure 11:
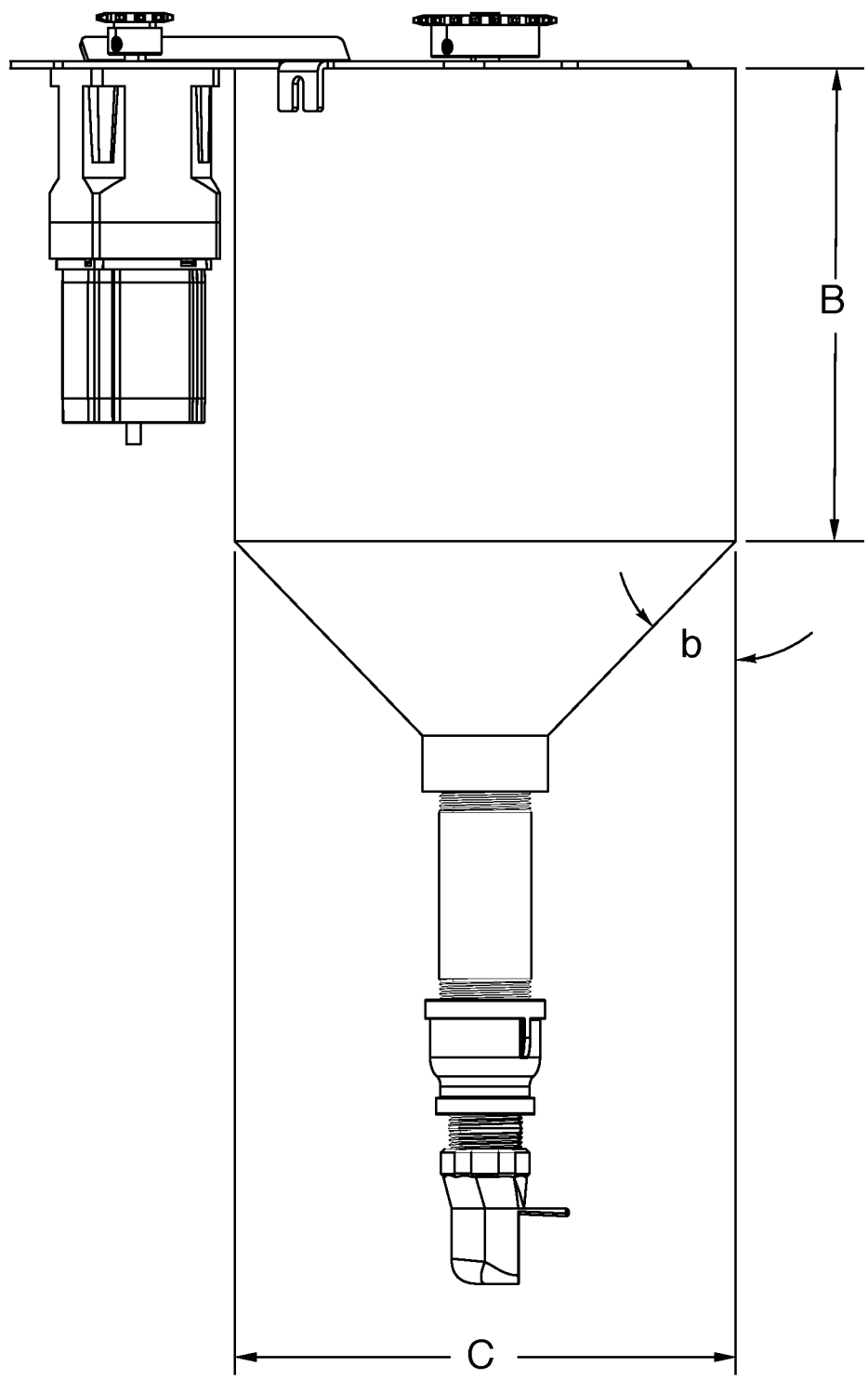
FIG. 11 is a right side view of the extruder.
Figure 12:
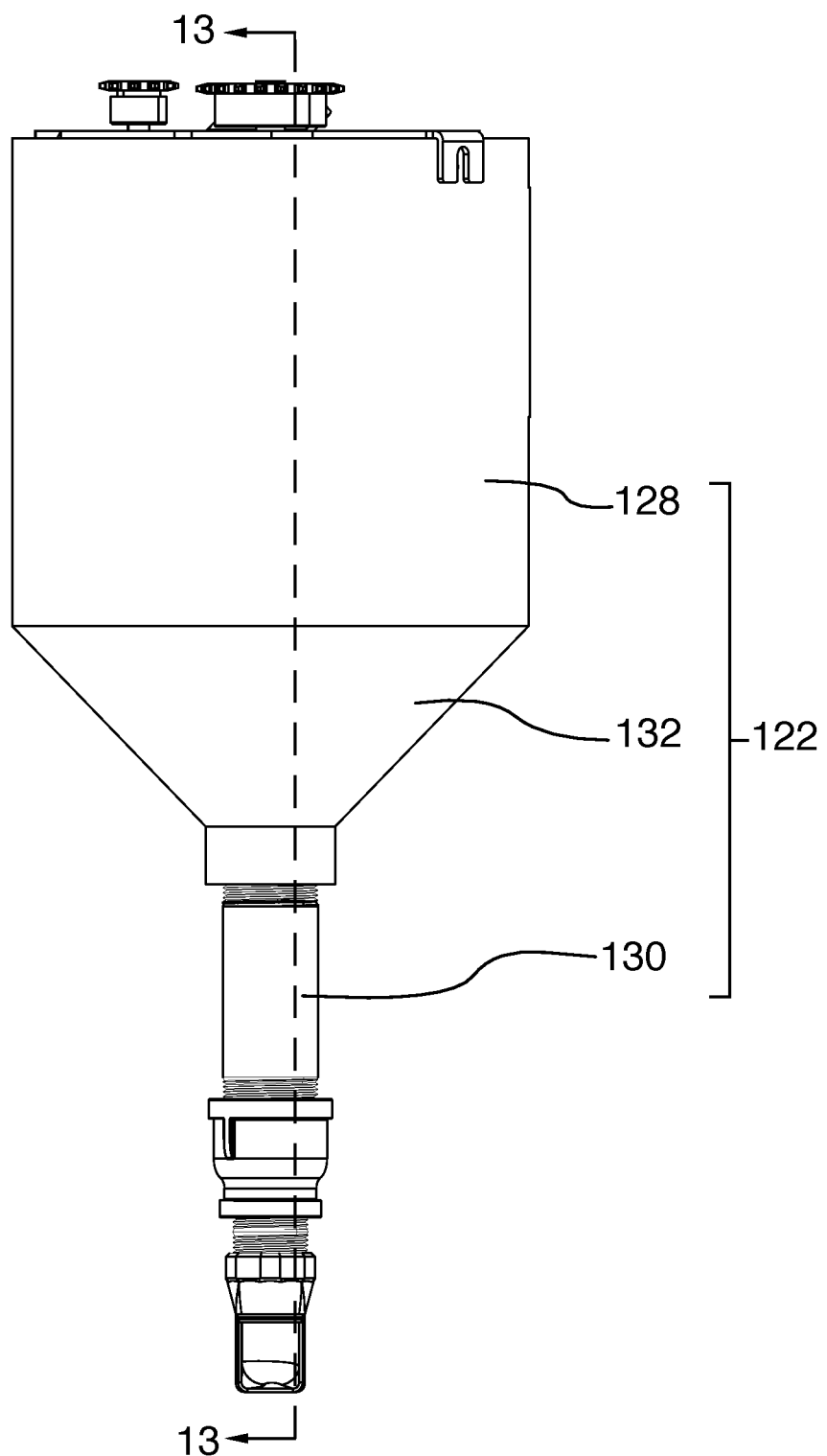
FIG. 12 is a front view of the extruder.
Figure 13:
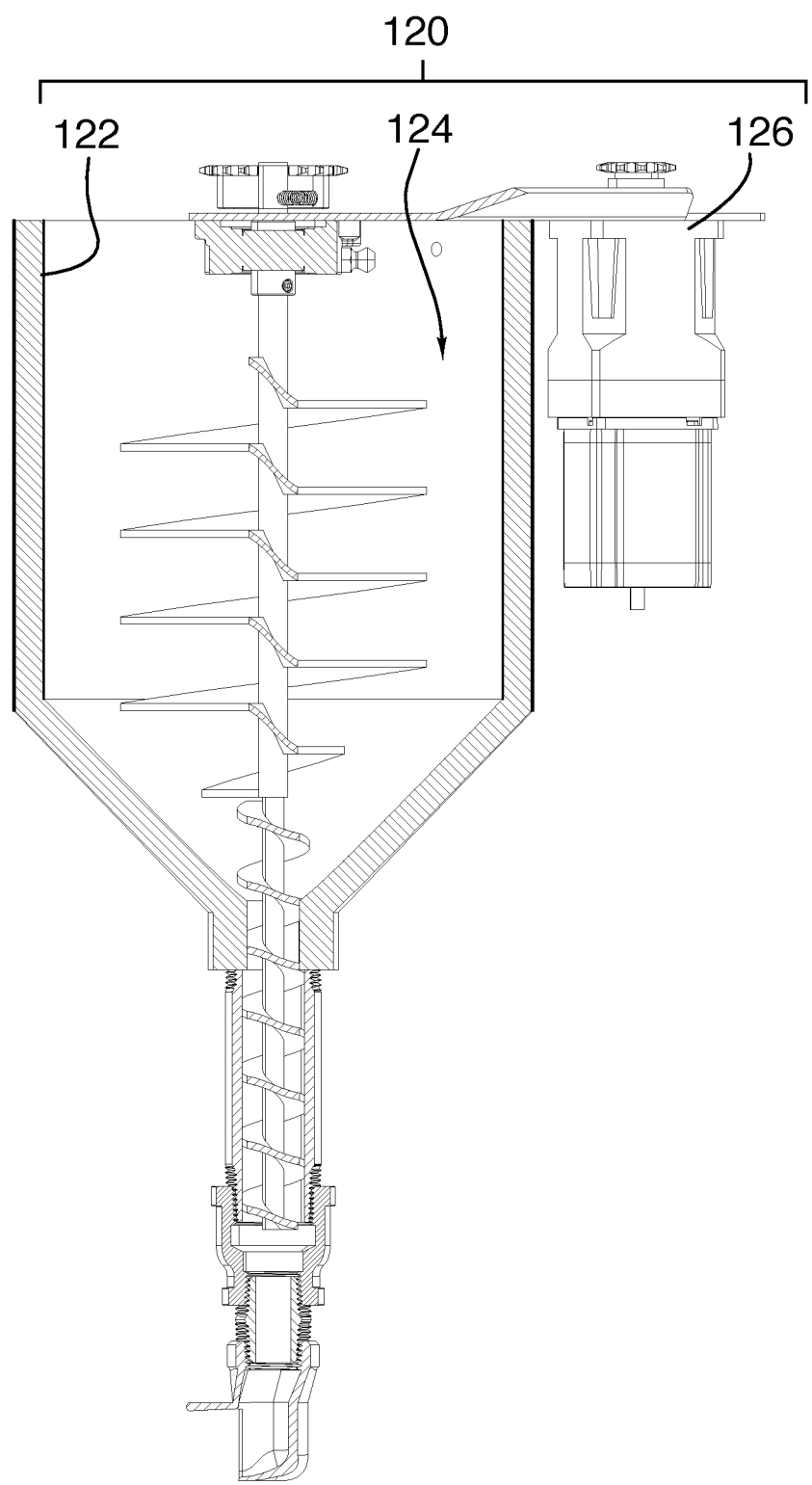
FIG. 13 is a view along section 13-13 of FIG. 12.
Figure 14:
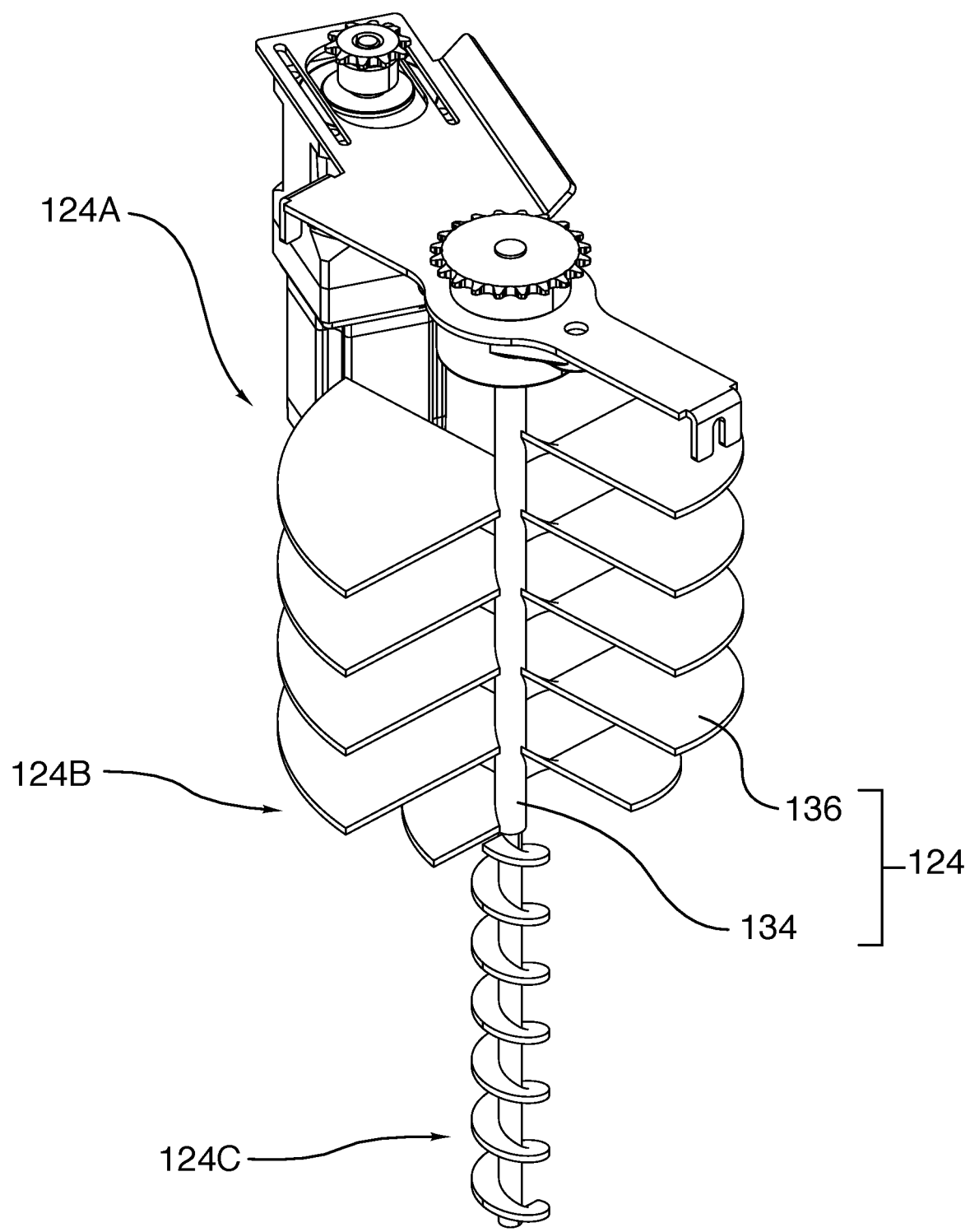
FIG. 14 is a front top view of a portion of the structure of FIG. 7
Figure 15:
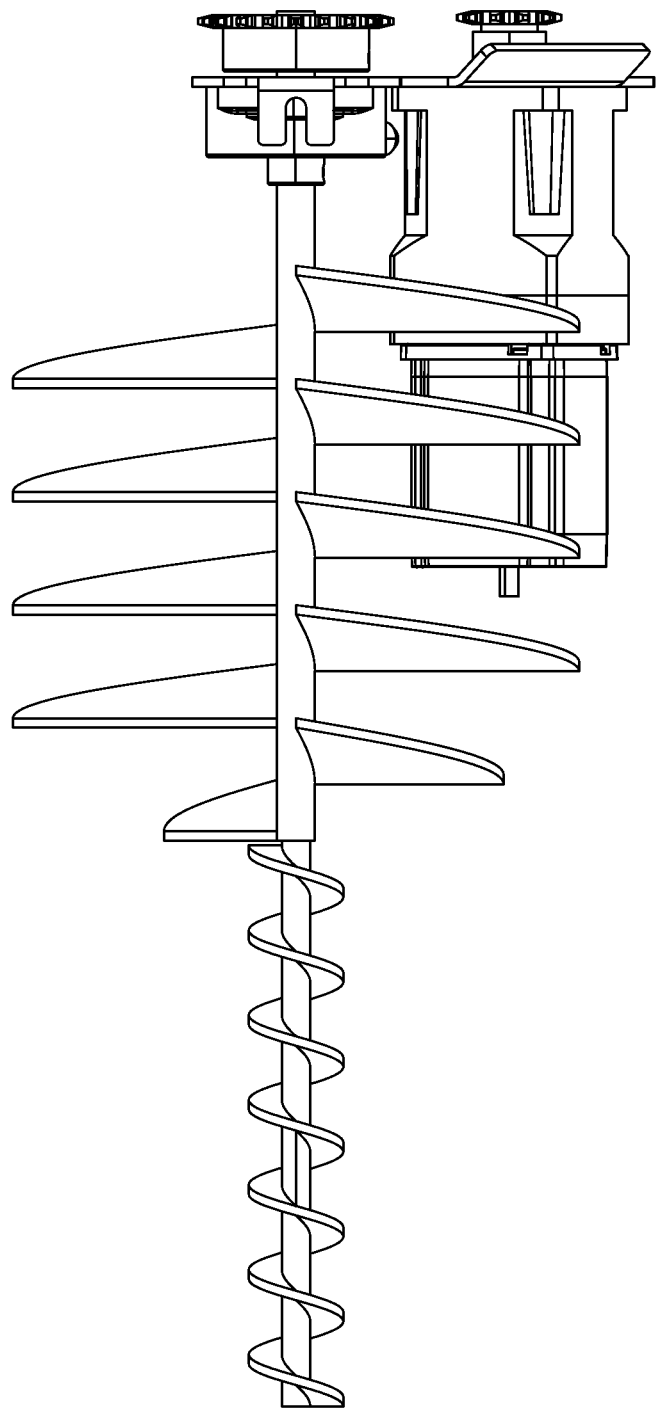
FIG. 15 is a left side view of the structure of FIG. 14.
Figure 16:
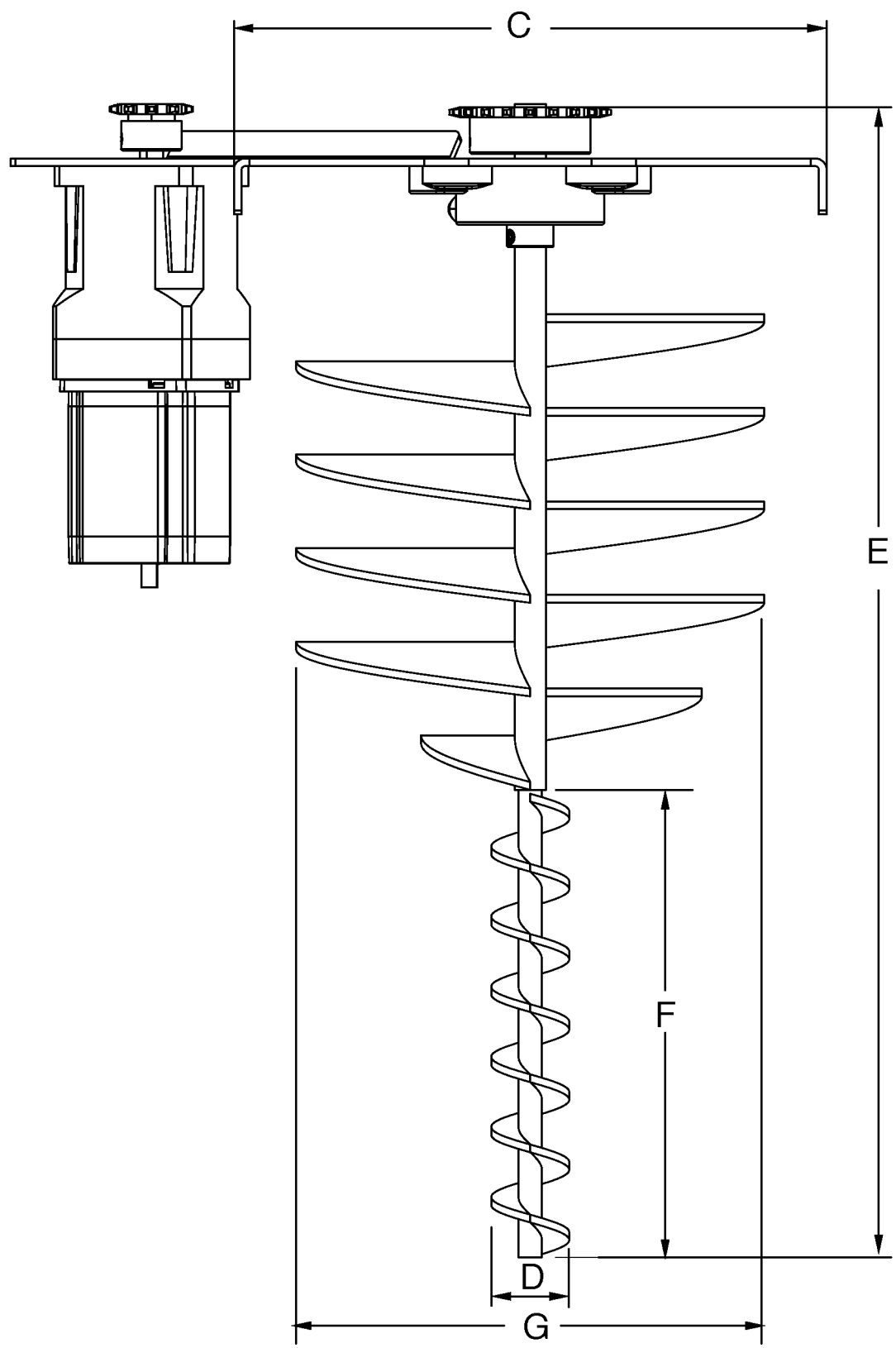
FIG. 16 is a right side view of the structure of FIG. 14.
Figure 17:
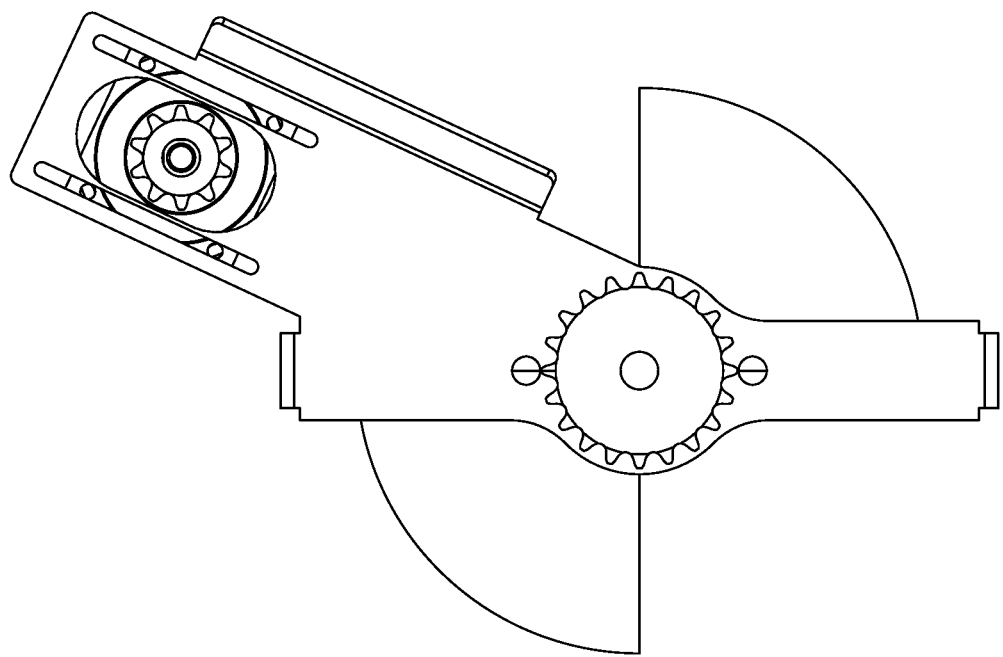
FIG. 17 is a top view of the structure of FIG. 14.

The nozzle 20 shown in FIGS. 1-6 and will be seen to have an outlet 22 defined by:
- a pair of planar sidewalls 24, a planar base 26 and a planar top 28, all creating a rectangular channel with a width W of 1" and a height H of 1.25"; and
- a rib 30 orientated parallel to the sidewalls and projecting 0.25" upwardly from the base.

Extruder

The extruder 120 shown in FIGS. 7-12 will be seen to include a funnel 122, an impeller 124 and a motor 126.

The funnel 122 has an upper cylindrical portion 128 having a diameter C and a depth B, a lower tubular portion 130 having a diameter substantially smaller than that of the upper portion and an intermediate frustoconical portion 132 leading from the upper portion to the lower portion. The intermediate portion 132 tapers at angle β.

The impeller 124 is an auger bit generally of the Irwin pattern type, to wit, having a solid stem 134 with a single spiral 136 that extends the length of the funnel, characterized in that:
- the total length of the auger is E
- the portion of the bit 124A in the upper portion 128 of the funnel has a diameter D and is cut away in two opposed quadrants
- the portion of bit 124B in the intermediate portion 132 of the funnel tapers frustoconically at angle β; and
- the portion of bit 124C in the lower portion 130 of the funnel has a diameter G and a length F The motor 126 will be understood to be configured to rotate the impeller.

Applicator

Figure 18:
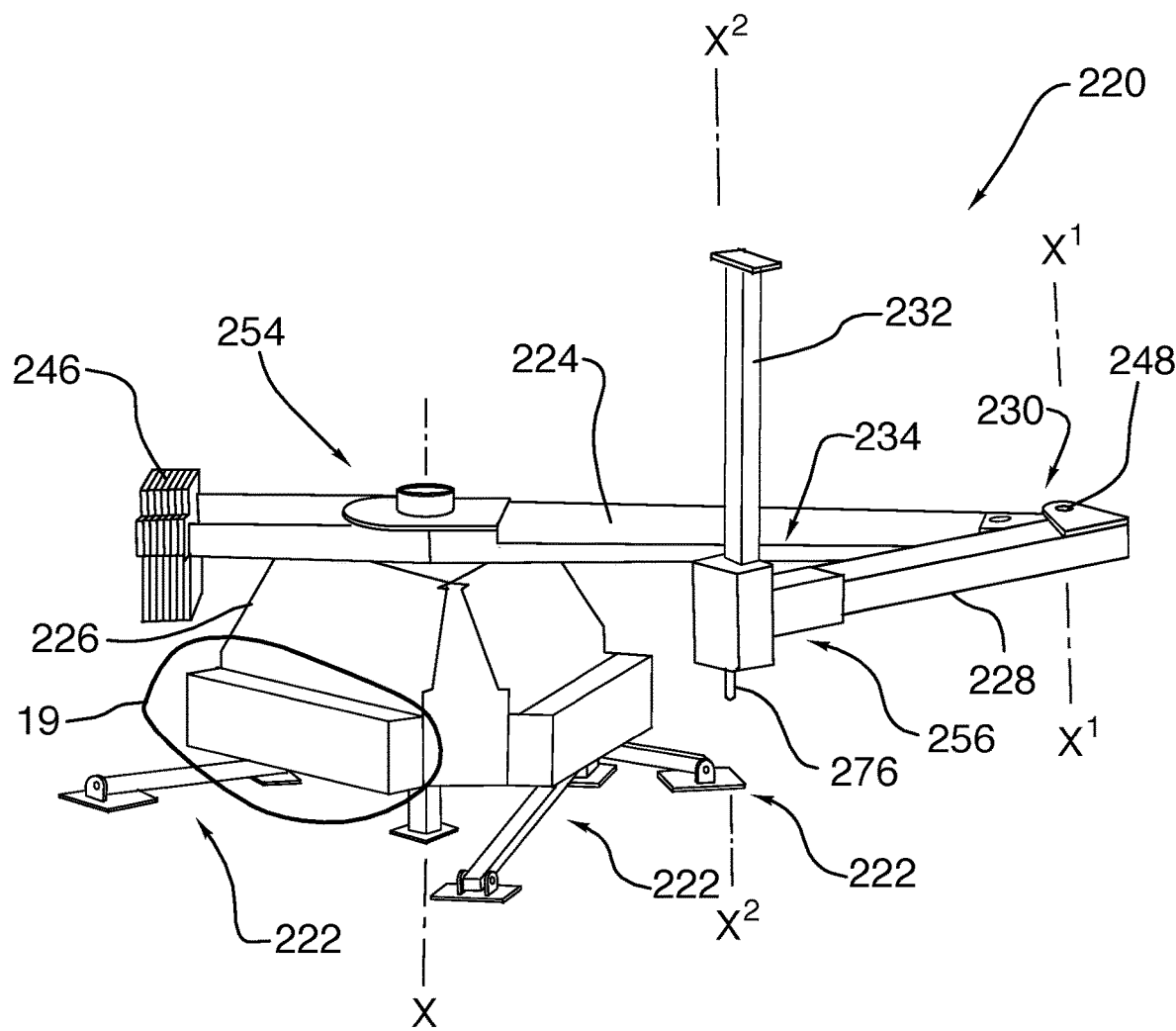
FIG. 18 is a perspective view of the applicator.
Figure 19:
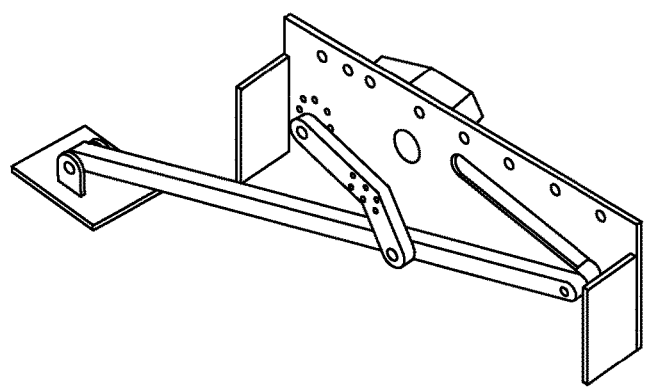
FIG. 19 is an enlarged view of the structure of encircled area 19 of FIG. 18, with a cover removed for clarity.
Figure 20:
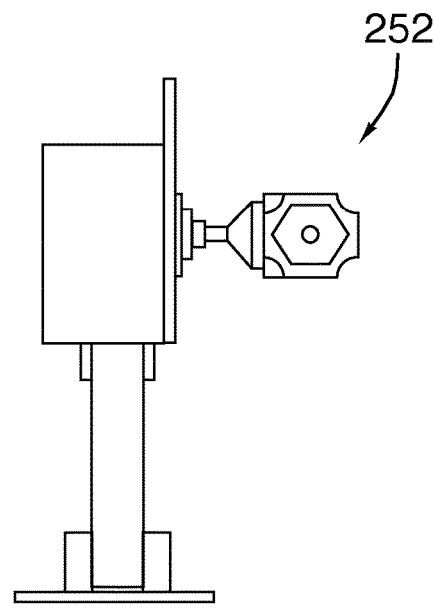
FIG. 20 is an end view of the structure of FIG. 19.
Figure 21:
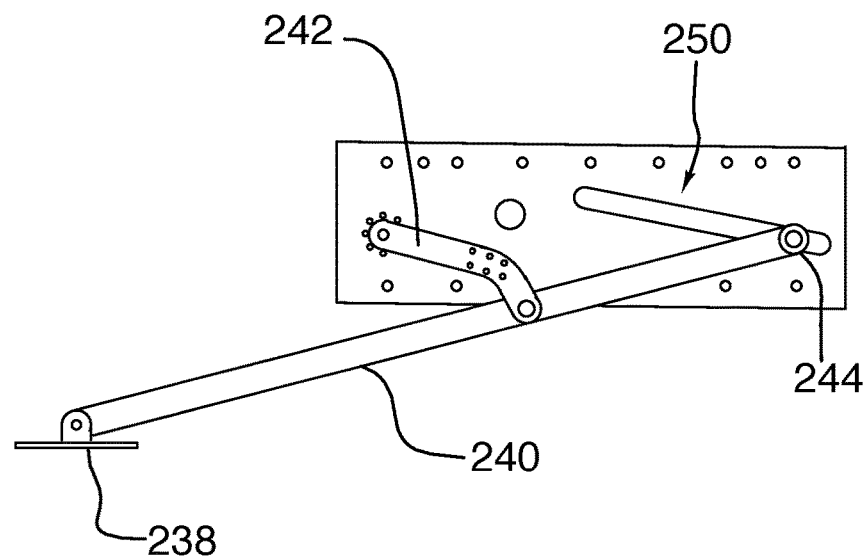
FIG. 21 is a side view of the structure of FIG. 19.

An applicator 220 is shown in FIG. 18 and will be understood to have a plurality of legs 222, a primary arm 224, a body 226, a secondary arm 228, an actuator 230, a tertiary arm 232, an elevation mechanism 234 and a rotator 236.

Each leg has a foot 238, a leg beam 240, a swing arm 242 and a cam follower 244. The foot is planar and is adapted for engagement with a concrete base. The leg beam 240 extends from the foot 238 to the cam follower 244 and is pivotally connected to each. The secondary arm 242 extends from the leg beam 240 to the body 226 and is pivotally connected to each. The pivotal connections are all horizontal.

The primary arm 224 has a counterweight 246 and a rotary joint 248 and extends therebetween.

The body has a plurality of cam tracks 250, a lift mechanism 252 and a primary rotation mechanism 254.

The cam tracks 250 are provided one for each cam follower 244, each cam follower 224 being mounted for sliding movement in the cam track 250 provided therefor.

The lift mechanism 252 includes a motor arrangement operatively coupled to the secondary arms 242 to selectively rotate the secondary arms 242.

The primary rotation 254 mechanism includes a motor operatively coupled to the primary arm 224 at an intermediate point thereof, for rotating the primary arm about a vertical axis X-X.

The secondary arm has a socket 256 and extends from the rotary joint 248 to the socket 256, the rotary joint allowing for pivotal movement of the secondary arm about a vertical pivot axis X'-X'.

Actuator 230 is operatively coupled between the primary arm 224 and the secondary arm 228 and provides for selective movement about pivot axis X'-X'.

The tertiary arm 232 is mounted in the socket 256 for vertical translational movement and has an upper end and a lower end.

The elevation mechanism 234 is operatively coupled between the tertiary arm 232 and the secondary arm 228 and provides for selective vertical translational movement of the tertiary arm 232 relative to the secondary arm 228m.

The rotator 236 is coupled to the lower end of the tertiary arm 232 and is adapted to selectively rotate about a vertical axis $X^2$-$X^2$ Use of the Extruder and the Nozzle The extruder 120 was used to deliver, through the nozzle 20, three beads of concrete, each dimensioned at 1.25"× 1.25", laid one upon another, at a rate of 50 feet per minute. In the structure so used, the following geometry was followed:

B: 8.50"
C: 9.00"
E: 18.50"
F: 7.50"
G: 1.25"
D: 7.50"
β: 45°

The concrete mixture used was in the ratio:
1 cubic foot sand
1 cubic foot Portland cement
1 cubic foot water
6 oz of Sika, Viscoflow-2020

Surprisingly, the resulting wall surface [defined by the stacked beads] was vertical with no bulges or depressions greater than 1/16".

Without intending to be bound by theory, the advantageous wall surface may result from the structure of the nozzle, which created two streams of fluidic concrete, by virtue of the central rib, which merge together, as indicated by FIG. 22-24, which show the nozzle starting a bead.

Use of the Applicator

The Applicator 220 can also be used with extruder 120 and nozzle 20 to form a structure. To do so:
- the nozzle 20 is mounted to the rotator 236 arm and operatively coupled to the extruder;
- each of the feet are anchored to the ground;
- the swing arms are pivoted until the primary axis is vertical;
- the tertiary arm is lowered until the nozzle is at the desired position; and
- the nozzle is robotically guided by appropriate actuation of the tertiary arm, primary arm, secondary arms, swing arms and rotator to layer beads of concrete upon one another until the structure is complete.

Persons of ordinary skill will ready appreciate that the Applicator embodies numerous advantages:
- a work area having an inner diameter of 4 m, an outer diameter of 14 m, a height of 3 m can be obtained using off-the-shelf controls, commonplace methods of construction and commonplace materials (to construct the applicator)

the Applicator cannot deposit concrete upon itself

Applicator is compact enough to be moved on a highway trailer without hazard signage the nozzle can reach the ground even when the body is fully lowered Applicator can adjust to uneven ground relatively high deposit accuracy (plus or minus 2 mm) at all points in the work area relatively high deposit speed at all points in the work area the rotator allows the nozzle to be aimed along the direction of travel

VARIATIONS

Whereas a specific concrete mixture is specified, variations are possible.

Without limitation, the amount of water will need to vary based upon the moisture content in the sand. As well, a bead can be laid as fast as 400 inches per minute.

Further, whereas specific sizes and geometries are mentioned, variations are possible.

Accordingly, the invention should be understood to be limited only by the accompanying claims, purposively construed.

What is claimed is:

1. An applicator for use in dispensing a concrete mixture, the applicator comprising:
    a body adapted for constrained vertical movement;
    a primary arm operatively mounted to the body for movement about a vertical axis, the primary arm:
        being elongate;
        having a pair of ends;
        having a vertical axis adjacent one of the pair of ends; and
        having a counterweight adjacent the other pair of ends;
    a secondary arm defining a vertical axis, the secondary arm extending from the vertical axis defined by the primary arm and configured for movement about said vertical axis;
    a tertiary arm mounted for vertical translation movement along the vertical axis defined by the secondary arm;
    a rotator carried by the tertiary arm and in which use carried the nozzle and is adapted to rotate the nozzle about a vertical axis;
    a primary rotation mechanism for rotating the primary arm about the vertical axis;
    an actuator providing for selective movement of the secondary arm about the vertical axis;
    an elevation mechanism operatively coupled between the tertiary arm and the secondary arm and provided for said selective vertical translation movement; and
    an extruder to form a structure, the extruder comprising:
        a funnel having:
            a vertical axis;
            a length defined by the axis;
            a frustoconical portion oriented coaxially with the axis such that it tapers in diameter from top to bottom;
            a substantially cylindrical portion oriented coaxially with the axis and disposed above and in sealed communication with the top of the frustoconical portion;
            a tubular portion oriented coaxially with the axis and disposed beneath and in sealed communication with the bottom of the frustoconical portion;
        an impeller disposed coaxially with and within the funnel, the impeller defined by an auger bit that extends substantially the length of the funnel; and
        a motor rotating the impeller.

2. The applicator of claim 1, wherein the body has:
    a plurality of legs, each leg having:
        a foot configured for ground engagement;
        a cam follower;
        a leg beam that extends from the foot to the cam follower and is pivotally connected thereto each about respective horizontal axes; and
        a swing arm that extends from the leg beam to the body and is pivotally connected thereto each about respective horizontal axes;
    a plurality of cam tracks provided one for each cam follower, each cam track being in receipt of the cam follower for which it is provided and providing for sliding movement thereof; and
    a lift mechanism configured to selectively rotate the secondary arms.

3. An extruder according to claim 1, wherein the impeller is an auger bit generally of the Irwin pattern type.

4. An extruder according to claim 1, wherein:
    the auger bit has a solid stem with a single spiral that extends the length of the funnel;
    the portion of the bit in the substantially cylindrical portion of the funnel is cut away in two opposed quadrants; and
    the portion of the bit in the frustoconical portion of the funnel tapers frustoconically.

5. An extruder according to claim 2, wherein the impeller is an auger bit generally of the Irwin pattern type.

6. An extruder in combination with claim 2, wherein:
    the auger bit has a solid stem with a single spiral that extends the length of the funnel;
    the portion of the bit in the substantially cylindrical portion of the funnel is cut away in two opposed quadrants; and
    the portion of the bit in the frustoconical portion of the funnel tapers frustoconically.

7. An extruder in combination with claim 1 further comprising a nozzle, the nozzle comprising:
    an outlet defined by a pair of planar sidewalls, a planar base and a planar top all creating a rectangular channel with a width W and a height H; and
    a rib orientated parallel to the sidewalls and projecting distance P upwardly from the base.

8. An extruder in combination with claim 2 further comprising a nozzle, the nozzle comprising:
    an outlet defined by a pair of planar sidewalls, a planar base and a planar top all creating a rectangular channel with a width W and a height H; and
    a rib orientated parallel to the sidewalls and projecting distance P upwardly from the base.

9. The combination of claim 7, wherein the ratio of B:C:E:F:G:D:β is about: 8.5":9:00":18.5":7.5":1.25":7.5":45 degrees.

10. The combination of claim 8, wherein the ratio of B:C:E:F:G:D:β is about: 8.5":9:00":18.5":7.5":1.25":7.5":45 degrees.

11. Use of the combination of claim 7 to lay a bead of concrete at 50 feet per minute.

12. Use of the combination of claim 8 to lay a bead of concrete at 50 feet per minute.

* * * * *